United States Patent
Haas

(10) Patent No.: US 10,419,336 B2
(45) Date of Patent: Sep. 17, 2019

(54) USING DISAGGREGATED ROUTE INFORMATION BASES ("RIBS") TO INCREASE THE RESILIENCY OF PROTOCOLS SUCH AS THE BORDER GATEWAY PROTOCOL ("BGP")

(71) Applicant: Juniper Networks, Inc., Sunnyvale, CA (US)

(72) Inventor: Jeffrey M. Haas, Ypsilanti, MI (US)

(73) Assignee: Juniper Networks, Inc., Sunnyvale, CA (US)

( * ) Notice: Subject to any disclaimer, the term of this patent is extended or adjusted under 35 U.S.C. 154(b) by 16 days.

(21) Appl. No.: 15/900,742

(22) Filed: Feb. 20, 2018

(65) Prior Publication Data
US 2019/0260672 A1 Aug. 22, 2019

(51) Int. Cl.
| | |
|---|---|
| *H04L 12/28* | (2006.01) |
| *H04L 12/781* | (2013.01) |
| *H04L 29/06* | (2006.01) |
| *H04L 29/08* | (2006.01) |
| *H04L 12/707* | (2013.01) |

(52) U.S. Cl.
CPC .............. *H04L 45/52* (2013.01); *H04L 45/24* (2013.01); *H04L 67/104* (2013.01); *H04L 69/18* (2013.01)

(58) Field of Classification Search
CPC ....... H04L 45/52; H04L 45/24; H04L 67/104; H04L 69/18
See application file for complete search history.

(56) References Cited

U.S. PATENT DOCUMENTS

| | | | |
|---|---|---|---|
| 2006/0140136 A1* | 6/2006 | Filsfils | H04L 45/02 370/255 |
| 2010/0329153 A1* | 12/2010 | Xu | H04L 41/082 370/254 |

(Continued)

*Primary Examiner* — Luat Phung
(74) *Attorney, Agent, or Firm* — John C. Pokotylo; Pokotylo Patent Services

(57) ABSTRACT

The challenge of isolating a protocol peer(s) from routing information churn caused by to a peering protocol (e.g., due to updating the peering protocol, due to a bug in the peering protocol, due to a crash in the peering protocol, etc.) is solved by using a separate data store to isolate the protocol peer(s) from the peering protocol. The separate data store may: (a) receive, from at least one of the outside peering devices, incoming routing information; (b) store the incoming routing information received in a first storage system; (c) provide a copy of at least some of the stored incoming routing information received to a second storage system used by a process for selecting routes using the routing information, the process generating state information to be distributed (e.g., one or more routes with BGP properties (which may include one or more selected routes) and a set of outside peers to distribute them to) and storing the state information in the second storage system; (d) receive a copy of the state information generated and stored by the process; (e) store the received copy of the state information in the first storage system; and (f) provide at least some information from the copy of the state information to at least one outside peer device in accordance with a route advertisement process, regardless of a state or status of the process for selecting routes.

15 Claims, 10 Drawing Sheets

(56) References Cited

U.S. PATENT DOCUMENTS

2012/0254465 A1* 10/2012 Papadimitriou ........ H04L 45/14
709/242
2014/0237138 A1* 8/2014 Xu ........................ H04L 69/329
709/238

* cited by examiner

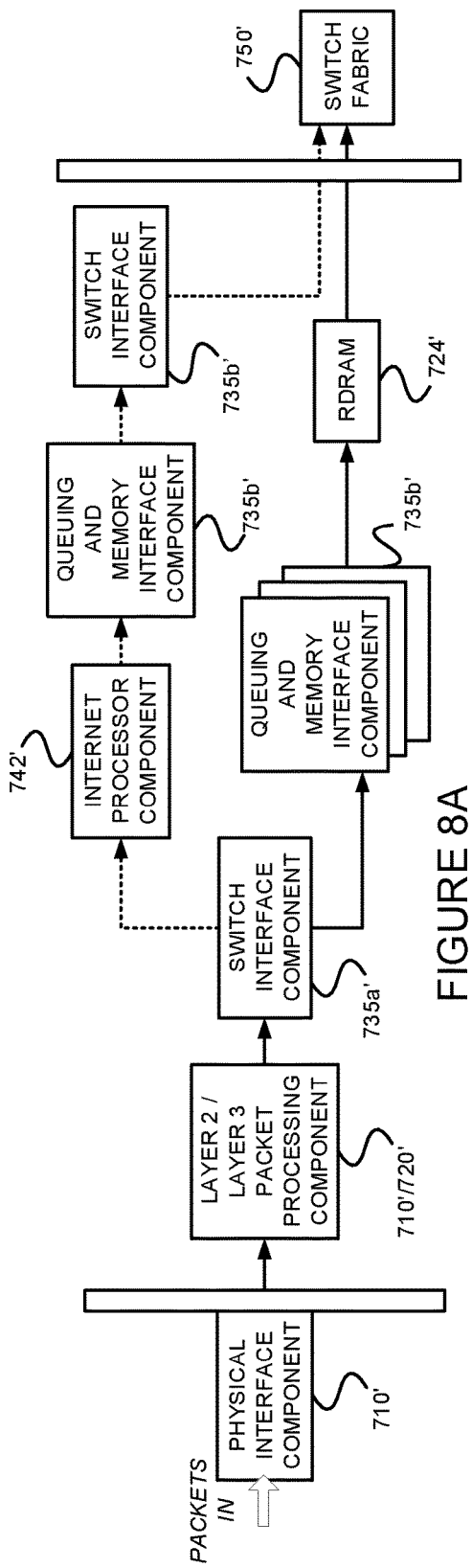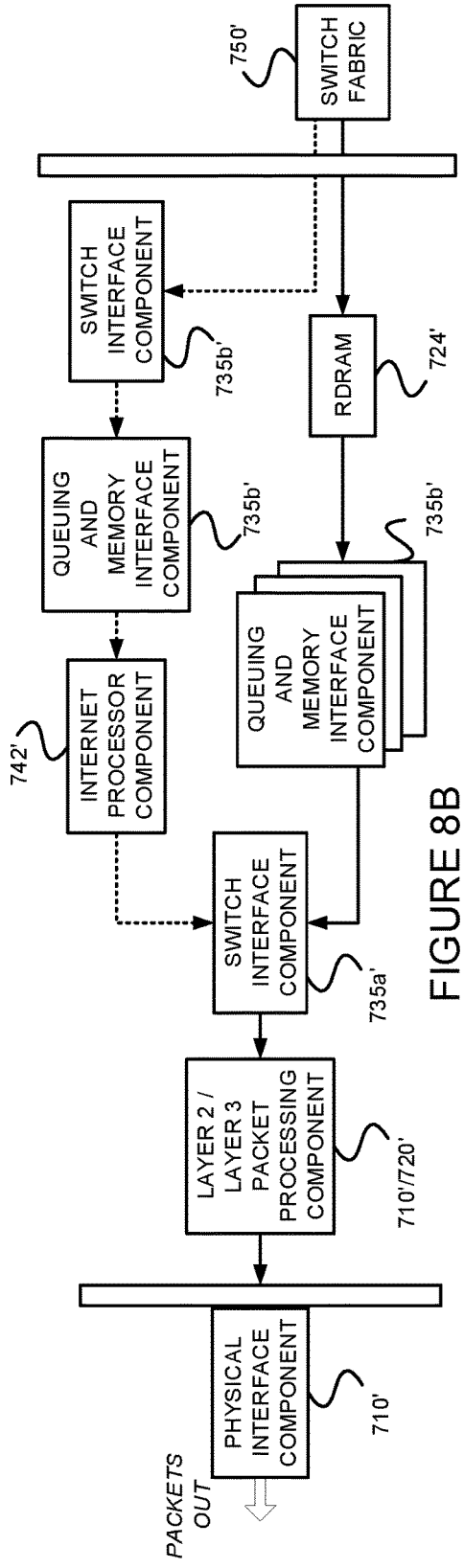

USING DISAGGREGATED ROUTE INFORMATION BASES ("RIBS") TO INCREASE THE RESILIENCY OF PROTOCOLS SUCH AS THE BORDER GATEWAY PROTOCOL ("BGP")

§ 1. BACKGROUND OF THE INVENTION

§ 1.1 Field of the Invention

Example embodiments consistent with the present invention concern network communications. In particular, at least some such example embodiments concern improving the resiliency of protocols, such as the Border Gateway Protocol ("BGP") described in Request for Comments ("RFC") 4271 (incorporated herein by reference) of the Internet Engineering Task Force ("IETF").

§ 1.2 Background Information

In network communications system, protocols are used by devices, such as routers for example, to exchange network information. Routers generally calculate routes used to forward data packets towards a destination. Some protocols, such as the Border Gateway Protocol ("BGP"), which is summarized in § 1.2.1 below, allow routers in different autonomous systems ("ASes") to exchange reachability information.

§ 1.2.1 the Border Gateway Protocol ("BGP")

The Border Gateway Protocol ("BGP") is an inter-Autonomous System routing protocol. The following refers to the version of BGP described in RFC 4271 (incorporated herein by reference). The primary function of a BGP speaking system is to exchange network reachability information with other BGP systems. This network reachability information includes information on the list of Autonomous Systems (ASes) that reachability information traverses. This information is sufficient for constructing a graph of AS connectivity, from which routing loops may be pruned, and, at the AS level, some policy decisions may be enforced.

It is normally assumed that a BGP speaker advertises to its peers only those routes that it uses itself (in this context, a BGP speaker is said to "use" a BGP route if it is the most preferred BGP route and is used in forwarding).

Generally, routing information exchanged via BGP supports only the destination-based forwarding paradigm, which assumes that a router forwards a packet based solely on the destination address carried in the IP header of the packet. This, in turn, reflects the set of policy decisions that can (and cannot) be enforced using BGP.

BGP uses the transmission control protocol ("TCP") as its transport protocol. This eliminates the need to implement explicit update fragmentation, retransmission, acknowledgement, and sequencing. When a TCP connection is formed between two systems, they exchange messages to open and confirm the connection parameters. The initial data flow is the portion of the BGP routing table that is allowed by the export policy, called the "Adj-Ribs-Out."

Incremental updates are sent as the routing tables change. BGP does not require a periodic refresh of the routing table. To allow local policy changes to have the correct effect without resetting any BGP connections, a BGP speaker should either (a) retain the current version of the routes advertised to it by all of its peers for the duration of the connection, or (b) make use of the Route Refresh extension.

KEEPALIVE messages may be sent periodically to ensure that the connection is live. NOTIFICATION messages are sent in response to errors or special conditions. If a connection encounters an error condition, a NOTIFICATION message is sent and the connection is closed.

A BGP peer in a different AS is referred to as an external peer, while a BGP peer in the same AS is referred to as an internal peer. Internal BGP and external BGP are commonly abbreviated as IBGP and EBGP, respectively.

If a particular AS has multiple BGP speakers and is providing transit service for other ASes, then care must be taken to ensure a consistent view of routing within the AS. A consistent view of the interior routes of the AS is provided by the IGP used within the AS. In some cases, it is assumed that a consistent view of the routes exterior to the AS is provided by having all BGP speakers within the AS maintain interior BGP ("IBGP") with each other.

Many routing protocols have been designed to run within a single administrative domain. These are known collectively as "Interior Gateway Protocols" ("IGPs"). Typically, each link within an AS is assigned a particular "metric" value. The path between two nodes can then be assigned a "distance" or "cost", which is the sum of the metrics of all the links that belong to that path. An IGP typically selects the "shortest" (minimal distance, or lowest cost) path between any two nodes, perhaps subject to the constraint that if the IGP provides multiple "areas", it may prefer the shortest path within an area to a path that traverses more than one area. Typically, the administration of the network has some routing policy that can be approximated by selecting shortest paths in this way.

BGP, as distinguished from the IGPs, was designed to run over an arbitrarily large number of administrative domains ("autonomous systems" or "ASes") with limited coordination among the various administrations.

§ 1.2.1.1 Example Environment

FIG. 1 illustrates an example environment 100 in which the present invention may be used. The example environment 100 includes a single administrative entity 115 associated with multiple autonomous systems (ASes 110*a*, 110*b*, . . . 110*c*). The ASes 110*a*-110*c* include BGP routers 105*a*-105*e*. BGP routers within an AS generally run IBGP, while BGP routers peering with a BGP router in another AS generally run EBGP. As shown, BGP router 105*b* and 105*c* are peers (also referred to as "BGP speakers") in a BGP session (depicted as 120). During the BGP session 120, the BGP speakers 105*b* and 105*c* may exchange BGP update messages. Details of the BGP update message 190 are described in § 4.2.1 below.

§ 1.2.1.2 BGP "Update" Messages

In BGP, UPDATE messages are used to transfer routing information between BGP peers. The information in the UPDATE message can be used to construct a graph that describes the relationships of the various Autonomous Systems. More specifically, an UPDATE message is used to advertise feasible routes that share a common set of path attribute value(s) to a peer (or to withdraw multiple unfeasible routes from service). An UPDATE message MAY simultaneously advertise a feasible route and withdraw multiple unfeasible routes from service.

The UPDATE message 190 includes a fixed-size BGP header, and also includes the other fields, as shown in FIG. 1. (Note some of the shown fields may not be present in every UPDATE message). Referring to FIG. 1, the "Withdrawn Routes Length" field 130 is a 2-octets unsigned integer that indicates the total length of the Withdrawn Routes field 140 in octets. Its value allows the length of the Network Layer Reachability Information ("NLRI") field 170 to be determined, as specified below. A value of 0 indicates that no routes are being withdrawn from service, and that the WITHDRAWN ROUTES field 140 is not present in this UPDATE message 190.

The "Withdrawn Routes" field 140 is a variable-length field that contains a list of IP address prefixes for the routes that are being withdrawn from service. Each IP address prefix is encoded as a 2-tuple 140' of the form <length, prefix>. The "Length" field 142 indicates the length in bits of the IP address prefix. A length of zero indicates a prefix that matches all IP addresses (with prefix, itself, of zero octets). The "Prefix" field 144 contains an IP address prefix, followed by the minimum number of trailing bits needed to make the end of the field fall on an octet boundary. Note that the value of trailing bits is irrelevant.

Still referring to FIG. 1, the "Total Path Attribute Length" field 150 is a 2-octet unsigned integer that indicates the total length of the Path Attributes field 160 in octets. Its value allows the length of the Network Layer Reachability Information ("NLRI") field 170 to be determined. A value of 0 indicates that neither the Network Layer Reachability Information field 170 nor the Path Attribute field 160 is present in this UPDATE message.

The "Path Attributes" field 160 is a variable-length sequence of path attributes that is present in every UPDATE message, except for an UPDATE message that carries only the withdrawn routes. Each path attribute is a triple <attribute type, attribute length, attribute value> of variable length. The "Attribute Type" is a two-octet field that consists of the Attribute Flags octet, followed by the Attribute Type Code octet.

Finally, the "Network Layer Reachability Information" field 170 is a variable length field that contains a list of Internet Protocol ("IP") address prefixes. The length, in octets, of the Network Layer Reachability Information is not encoded explicitly, but can be calculated as: UPDATE message Length−23−Total Path Attributes Length (Recall field 150.)−Withdrawn Routes Length (Recall field 130.) where UPDATE message Length is the value encoded in the fixed-size BGP header, Total Path Attribute Length, and Withdrawn Routes Length are the values encoded in the variable part of the UPDATE message, and 23 is a combined length of the fixed-size BGP header, the Total Path Attribute Length field, and the Withdrawn Routes Length field.

Reachability information is encoded as one or more 2-tuples of the form <length, prefix>170', whose fields are shown in FIG. 1 and described here. The "Length" field 172 indicates the length in bits of the IP address prefix. A length of zero indicates a prefix that matches all IP addresses (with prefix, itself, of zero octets). The "Prefix" field 174 contains an IP address prefix, followed by enough trailing bits to make the end of the field fall on an octet boundary. Note that the value of the trailing bits is irrelevant.

§ 1.2.1.3 BGP Peering and Data Stores: The Conventional "Rib" Model

FIG. 2 is a diagram illustrating a conventional BGP RIB model in which a BGP speaker interacts with other BGP speakers (peers). (Recall, for example, that in FIG. 1, BGP routers 105b and 105c are peers (also referred to as "BGP speakers") in a BGP session (depicted as 120).) In FIG. 2, a BGP peer 210 has a session with one or more other BGP peers 250. The BGP peer 210 includes an input (for example, a control plane interface, not shown) for receiving, from at least one outside BGP speaker 250, incoming routing information 220. The received routing information is stored in Adj-RIBS-In storage 212. The information stored in Adj-RIBS-In storage 212 is used by a decision process 214 for selecting routes using the routing information. The decision process 214 generates "selected routes" as Loc-RIB information 216. The Loc-RIB information 216 is then stored in Adj-RIBS-Out storage 218. As shown by 230, at least some of the information in Adj-RIBS-Out storage is then provided to at least one outside BGP speaker peer device 250 in accordance with a route advertisement process.

Referring to communications 220 and 230, recall that BGP can communicate updated route information using the BGP UPDATE message.

More specifically, IETF RFC 4271 documents the current version of the BGP routing protocol. In it, the routing state of BGP is abstractly divided into three (3) related data stores (historically referred to as "information bases") that are created as part of executing the BGP pipeline. To reiterate, the Adj-RIBS-In 212 describes the set of routes learned from each (adjacent) BGP peer 250 for all destinations. The Loc-RIB 216 describes the result of the BGP decision process 216 (which may be thought of loosely as route selection) in choosing a best BGP route. The Adj-RIBS-Out 218 describes the process of injecting the selected route from the Loc-RIB 216 (or possibly a foreign route from another protocol) and placing it for distribution to (adjacent) BGP peers 250 using the BGP protocol (Recall, e.g. the UPDATE messages 190/230.).

The IETF's BGP RFCs intentionally do not describe implementation details for these RIBs 212/216/218 (also referred to as "data stores"), nor do they describe how the routes in each RIB are related to each other: Indeed, RFC 4271 states, "Although the conceptual model distinguishes between Adj-RIBs-In, Loc-RIB, and Adj-RIBs-Out, this neither implies nor requires that an implementation must maintain three separate copies of the routing information. The choice of implementation (for example, 3 copies of the information vs 1 copy with pointers) is not constrained by the protocol."

Many BGP implementations, including Junos routing process ("RPD") from Juniper Networks of Sunnyvale, Calif., create a single route data structure associated with learned BGP routes. This data structure is then utilized in route selection and augmented (e.g., routing table entries annotated with peer state) for advertisement to BGP peers, or sets of BGP peers (typically called peer groups). Such a design minimizes resources that are consumed. Heavily multi-threaded implementations of BGP will typically use similar data structures and utilize them in programmatic "functional" fashion wherein they do not acquire side effects or other mutable characteristics. Such designs may lead to some amount of additional resource use so as to only make use of immutable data structures (that is, in which a previous version is maintained when the data structure is modified).

More modern routing implementations may utilize abstracted general data store systems that provide such "functional programming" paradigm "safe repositories" for routes. These have the advantage that they are already tailored for multiple uses via publication/subscription protocol mechanisms. As best understood by the present inventor, these tend to be in the form of a "centralized RIB" owned by the BGP implementation.

§ 1.2.1.4 Resiliency Considerations for BGP

The BGP routing protocol is a stateful protocol run over TCP. Mechanisms such as its Graceful Restart feature (See, e.g., RFC 4724 and RFC 4781.) and Non-Stop Routing ("NSR") from Juniper Networks provide some level of resiliency to network outages. Unfortunately, however, they do not provide a way to easily run BGP as a component is upgraded. Further, Graceful Restart and NSR do not provide a mechanism to avoid exposing to the network a crash of the BGP component. Such disruptions can have an extreme impact on the network because the downstream routing state can potentially churn. Although NSR provides some level of isolating the network from BGP problems, the current design relies on a full inspection of all outgoing BGP routing state on a separate process in order to provide protection from outages. NSR has a potential problem due to "state explosion". Consider, for example, N routes in an Adj-Ribs-In. One of the N routes is selected in the Loc-Rib. This one route is then distributed to M Adj-Ribs-Out. (N and M are the total number of BGP peering sessions.) Since NSR replicates outbound state by watching the M updates, it is extremely resource intensive.

Thus, it would be useful to provide a way in which BGP as a protocol component may be updated without stopping BGP and without exposing such a change to the rest of the network. It was also be useful to protect BGP from crashes without the use of a secondary routing engine, or of a potentially full implementation of all BGP machinery running in a redundant mode.

§ 2. SUMMARY OF THE INVENTION

The challenge of isolating a protocol peer(s) from routing information churn caused by to a peering protocol (e.g., due to updating the peering protocol, due to a bug in the peering protocol, due to a crash in the peering protocol, etc.) is solved by using a separate data store to isolate the protocol peer(s) from the peering protocol. The separate data store may: (a) receive, from at least one of the outside peering devices, incoming routing information; (b) store the incoming routing information received in a first storage system; (c) provide a copy of at least some of the stored incoming routing information received to a second storage system used by a process for selecting routes using the routing information, the process generating state information to be distributed (e.g., one or more routes with BGP properties (which may include one or more selected routes) and a set of outside peers to distribute them to) and storing the state information in the second storage system; (d) receive a copy of the state information generated and stored by the process; (e) store the received copy of the state information in the first storage system; and (f) provide at least some information from the copy of state information to at least one outside peer device in accordance with a route advertisement process, regardless of a state or status of the process for selecting routes.

In some example embodiments consistent with the present invention, each of the outside peer device(s) is a BGP peer device. In such example embodiments, the routing information is received from a BGP peer device via a BGP UPDATE message, and at least some information from the copy of the state information is provided to a BGP peer device via another BGP UPDATE message.

In some example embodiments consistent with the present invention, the process for selecting routes is a BGP decision process and the state information includes at least one of the selected routes.

In some example embodiments consistent with the present invention, the first storage system includes (1) a first data structure for storing the incoming routing information and (2) a second data structure for storing the received copy of the state information Finally, in some example embodiments consistent with the present invention, the first storage system includes a data structure for storing both the incoming routing information and the received copy of the state information.

§ 3. BRIEF DESCRIPTION OF THE DRAWINGS

FIGS. 8A and 8B illustrate example packet forwarding operations of the example distributed ASICs of FIG. 7.

§ 4. DETAILED DESCRIPTION

Figure 1:
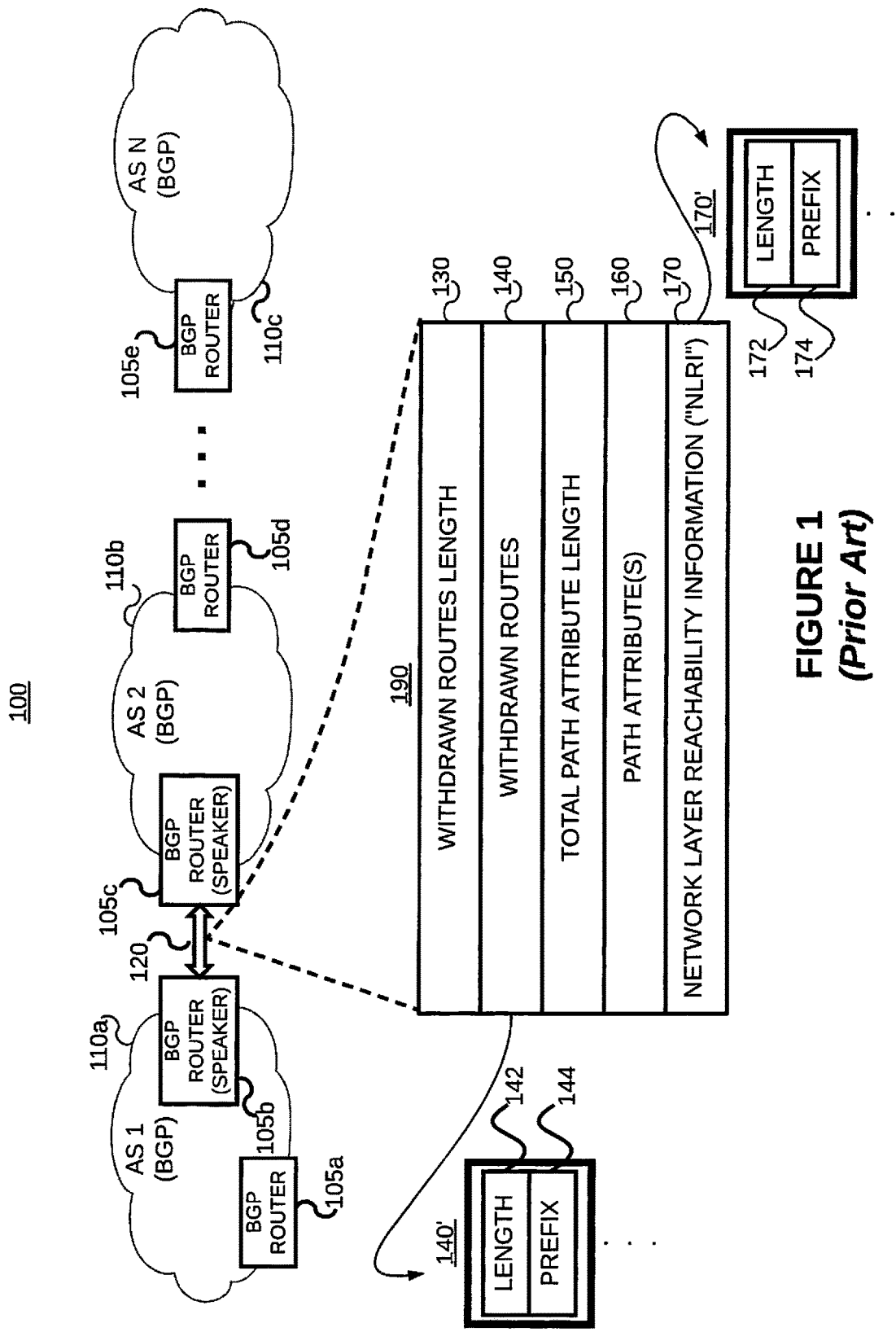
FIG. 1 illustrates an example environment in which the present invention may be used.

The present invention may involve novel methods, apparatus, message formats, and/or data structures for increasing the resiliency of a communications protocol, such as BGP for example, and to isolate peers from a problem with a communications protocol in one device. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventor regards his invention as any patentable subject matter described.

§ 4.1 Definitions

"Adj-RIB-In" contains unprocessed routing information that has been advertised to a local BGP speaker by its peers.

"Adj-RIB-Out" contains the routes for advertisement to specific peers by means of the local speaker's UPDATE messages.

"Autonomous System ("AS")": The classic definition of an Autonomous System is a set of routers under a single technical administration, using an interior gateway protocol ("IGP") and common metrics to determine how to route packets within the AS, and using an inter-AS routing protocol to determine how to route packets to other ASes. Since this classic definition was developed, it has become common for a single AS to use several IGPs and, sometimes, several sets of metrics within an AS. The use of the term Autonomous System stresses the fact that, even when multiple IGPs and metrics are used, the administration of an AS appears to other ASes to have a single coherent interior routing plan, and presents a consistent picture of the destinations that are reachable through it.

"BGP Identifier": A 4-octet unsigned integer that indicates the BGP Identifier of the sender of BGP messages. A given BGP speaker sets the value of its BGP Identifier to an IP address assigned to that BGP speaker. The value of the BGP Identifier is determined upon startup and is the same for every local interface and BGP peer.

"BGP speaker": A router that implements BGP.

"External BGP (or "eBGP")": A BGP connection between external peers.

"External peer": A peer that is in a different Autonomous System ("AS") than the local system.

"Feasible route": An advertised route that is available for use by the recipient.

"Internal BGP (or iBGP")": A BGP connection between internal peers.

"Internal peer": A peer that is in the same Autonomous System as the local system.

"Interior Gateway Protocol (or "IGP")": A routing protocol used to exchange routing information among routers within a single Autonomous System (AS).

"Loc-RIB": A routing information based that contains the routes that have been selected by the local BGP speaker's Decision Process.

"NLRI": Network Layer Reachability Information.

"Route": A unit of information that pairs a set of destinations with the attributes of a path to those destinations. The set of destinations are systems whose IP addresses are contained in one IP address prefix carried in the Network Layer Reachability Information (NLRI) field of an UPDATE message. The path is the information reported in the path attributes field of the same UPDATE message.

"RIB": Routing Information Base.

"Unfeasible route": A previously advertised feasible route that is no longer available for use.

Next, § 4.2 below provides a conceptual framework for understanding example methods and apparatus consistent with the present invention. Then, example methods are described in § 4.3 and example apparatus are described in § 4.4. Alternatives, refinements, and/or extensions of the example embodiments are then described in § 4.5. Finally, some conclusions concerning example embodiments consistent with the present invention are presented in § 4.6.

Figure 2:
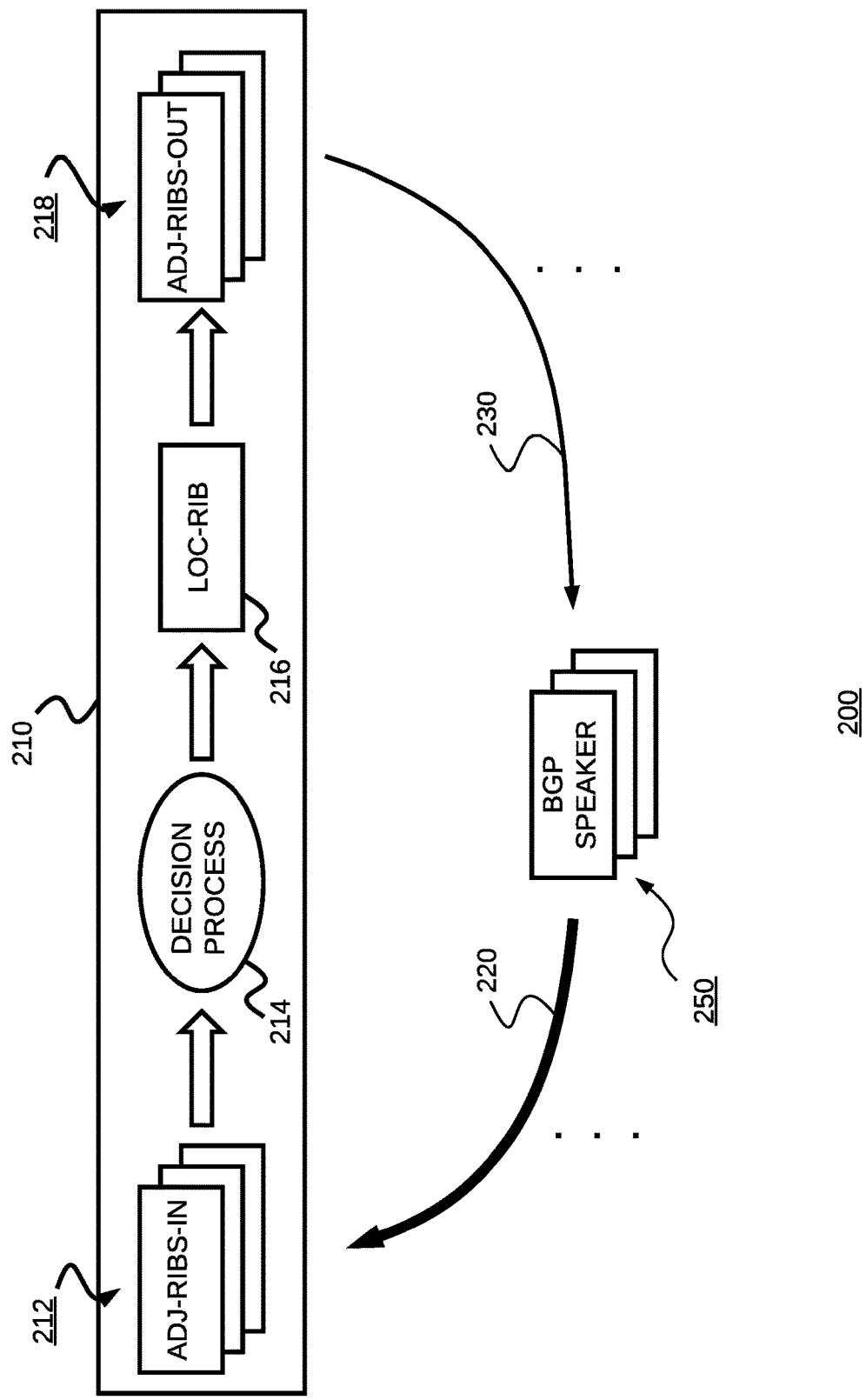
FIG. 2 is a diagram illustrating a conventional BGP RIB model in which a BGP speaker interacts with other BGP speakers (peers).

§ 4.2 Conceptual Framework of Example Methods and Embodiments Consistent with the Present Invention The present inventor has recognized that, abstractly, BGP's interaction for its abstract data model can be perceived to be through only its Adj-RIBS-In 212, where it learns routes and its Adj-RIBS-Out 218 where it advertises routes. That is, referring to FIG. 2, the BGP speaker 210 can be viewed by its peers 250 as simply Adj-RIBS-In 212 and Adj-RIBS-Out 218 since the peers 250 are isolated from the decision process 214 and the Loc-Rib 216. Restated slightly differently, the process of speaking the BGP protocol and distributing the stateful updates for that protocol (See communications 220 and 230 of FIG. 2.) may be functionally isolated from the internal logic that implements the protocol itself and its interactions with the subsystems that constitute a router. The present inventor has realized that such functional isolation of the learned routes and the intended and actual advertisement state has the potential benefit to isolate the outside BGP speakers from internal churn related to software updates to BGP, faults in BGP, or crashes of BGP.

Figure 3:
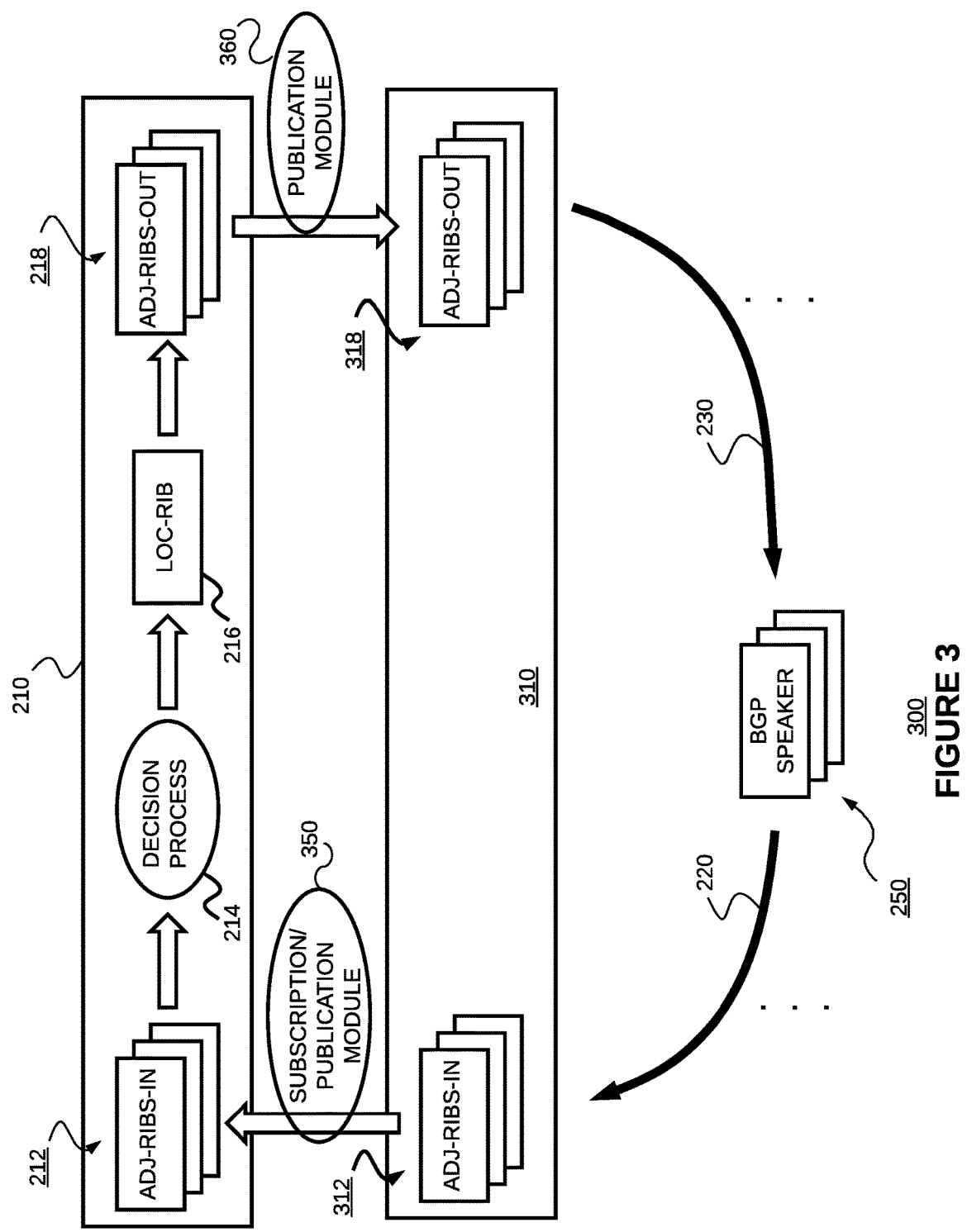
FIG. 3 is a diagram illustrating a BGP model, consistent with the present invention, in which disaggregated route information bases (ribs) to increase the resiliency of the BGP protocol.

FIG. 3 is a diagram illustrating a BGP model, consistent with the present invention, in which disaggregated route information bases (RIBS) to increase the resiliency of the BGP protocol. Note that conceptually making the BGP state machine, sockets, Adj-RIBS-In data store 312 and Adj-RIBS-Out data store 218 a separate functional component 310 increases the resiliency of a BGP device. This is distinct from other BGP implementations in that this isolation is not only done in a abstract functional method, but also in a concrete method. In this case, the use of Unix processes or similar analogs in other operating systems provides such a structural separation. In this way, the BGP speaker (peers) 250 are isolated from software updates to the BGP instance 210, faults in the BGP instance 210, or crashes of the BGP instance 210.

The example system 300 of FIG. 3 includes a Unix-like process 310 that implements the basics of the BGP routing protocol and that can establish a BGP peering session and maintaining instances of the BGP finite state machine. This process will learn routes from BGP peers 250 using standard BGP procedures. (Recall UPDATE messages 190/220.) It 310 will provide the necessary protocol syntactic validation (parsing) of received BGP UPDATE messages 190/220. It will store this in an internal, per-peer, data store; namely, the Adj-RIBS-In 312.

This process 310 includes a subscription/publication module 350 that permits applications, including BGP 210 (but not necessarily BGP exclusively) to "subscribe" to this data store 312 to learn BGP routes. This subscription feed may constitute all routes, or subsets of all routes, as provided by the subscription/publication module 350. The subscription/publication module 350 may, but need not, implement the BGP protocol.

This process 310 may interface with a publication module 360 by which an application, including BGP 210 (but not necessarily BGP exclusively), may publish its BGP routing state. (See, e.g., Adj-Ribs-Out 218 of FIG. 3.) This BGP routing state will constitute minimally BGP state per the BGP specifications (including RFC 4271, but also any desired extensions); namely Path Attributes (Recall, e.g., 160 of FIG. 1.), NLRI (Recall, e.g., 170 of FIG. 1.), and possibly extensions such as Path-identifier (to support add-paths), a set of BGP peers 250 to publish to, priority of this information, etc. The example publication module 360 permits publication of the above state either as new state to subsets of peers, or as a deletion of that state to sets of peers; for example, using BGP UPDATE and WITHDRAW messages. The publisher of the BGP state (e.g., 210 in FIG. 3) will be said to "own" this state. The example process 310 will only locally cache the result of this information. More specifically, the receiving repository of this state will be the Adj-RIBS-Out 318 of the process 310.

This process 310 will then appropriately synchronize its Adj-RIBS-Out 318 for each of its peers 250 using standard BGP protocol mechanisms. This process 310 will also provide a mechanism by which publishers (i.e., owners or sources of the router state information, such as the BGP instance 210) may refresh their Adj-RIBS-Out state and clear stale entries. This is analogous to BGP graceful restart procedures.

As shown in FIG. 3, a BGP implementation 210 may subscribe to such a process' Adj-RIBS-In 312, use this information as part of standard BGP protocol procedure (route selection, etc.) 214, calculate its Adj-RIBS-Out 218 and send it via the publication module 360 to the above process 310. Note, however, that the process 310 permits the BGP implementation(s) 210 to be decoupled from outside BGP speakers 250. In this way, any problems, bugs, updates, etc., in 210 are isolated from the outside peers 250. Thus, using the foregoing framework, one or more BGP applications or applications using BGP state may interact with this disaggregated RIBs infrastructure 310 to provide for resiliency of the BGP sessions (that is, BGP sessions between the outside peers 250 and the BGP instance 210).

§ 4.3 Example Methods

Figure 4:
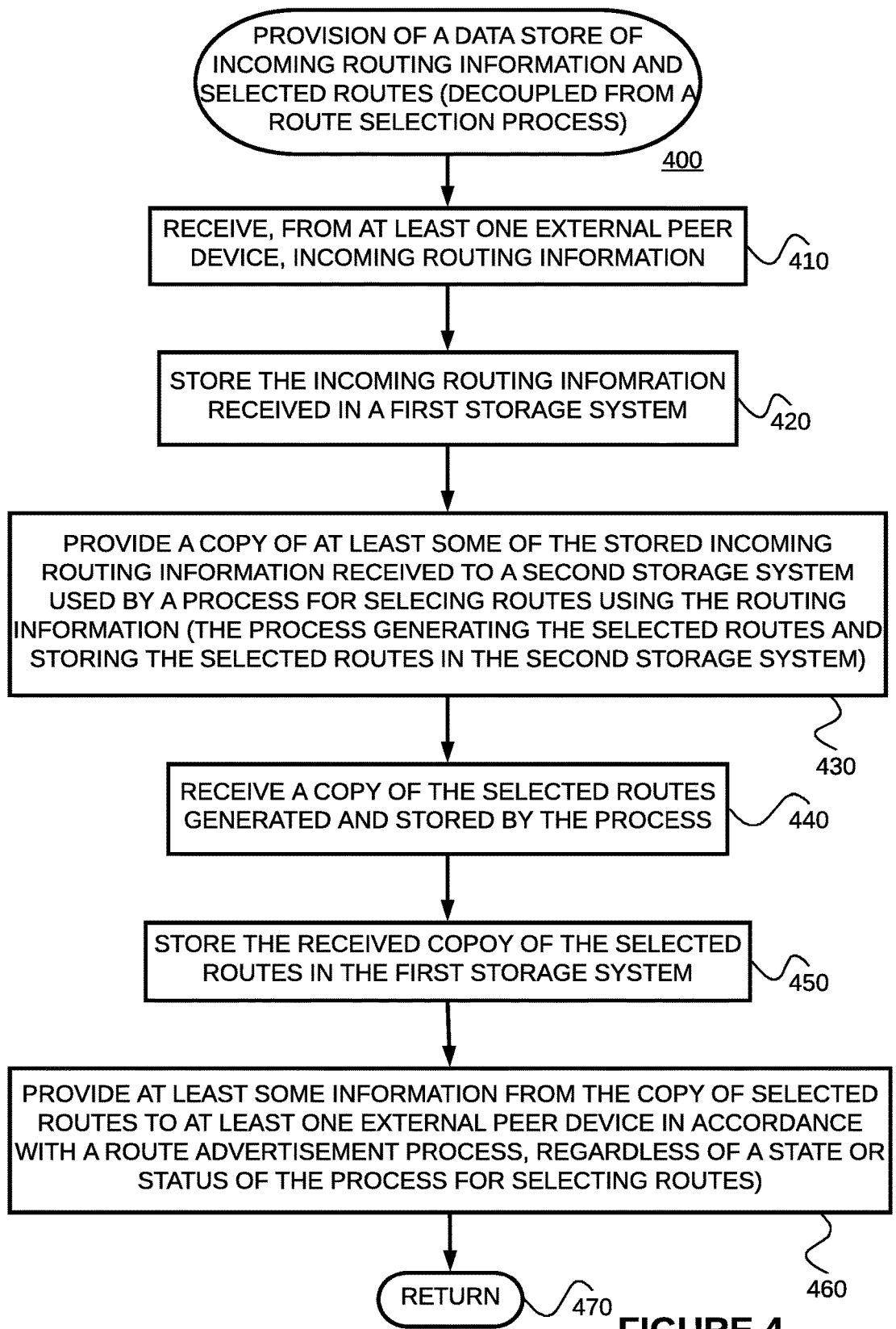
FIG. 4 is a flow diagram illustrating an example method for providing a data store of incoming routing information and state information to be distributed (which may include one or more selected routes), decoupled from a route selection process.

FIG. 4 is a flow diagram of an example method 400 for providing a data store of incoming routing information (e.g., BGP Adj-RIBS-In 312), and state information to be distributed (which may include one or more selected routes (e.g., BGP Adj-RIBS-Out 318)), decoupled from a route selection process (e.g., BGP decision process 214) in a manner consistent with the present invention. The example method 400 receives, from at least one outside peer device (e.g., a BGP speaker/peer 250), the incoming routing information. (Block 410) The example method 400 stores the incoming routing information received in a first storage system (e.g., including Adj-RIBS-In 312). (Block 420) A copy of at least some of the stored incoming routing information received is provided (e.g., via subscription/publication module 350) to a second storage system (e.g., including Adj-RIBS-In 212) used by a process (e.g., BGP decision process 214) for selecting routes using the routing information, the process generating the selected routes (e.g., Loc-RIB 216) and storing state information to be distributed (which may include one or more selected routes) in the second storage system (e.g., including Adj-RIBS-Out 218). (Block 430) The example method 400 then receives (e.g., via publication module 360) a copy of the state information generated and stored by the process, and stores the received copy of the state information in the first storage system (e.g., including Adj-RIBS-Out 318). (Blocks 440 and 450) Finally, the example method 400 provides at least some information from the copy of state information for distribution (which may include one or more selected routes (e.g., Adj-RIBS-Out 318)) to at least one outside peer device (e.g., BGP speaker/peer 250) in accordance with a route advertisement process, regardless of a state or status of the process for selecting routes. (Block 460) The example method 400 is then left. (Node 470)

As should be appreciated from the foregoing, the example method 400 can be performed by the apparatus 310 of FIG. 3.

In at least some example embodiments consistent with the example method 400, each of the at least one outside peer device is a BGP peer device, wherein the routing information is received from a BGP peer device via a BGP UPDATE message, and wherein at least some information from the copy of the state information is provided to a BGP peer device via another BGP UPDATE message. (See, e.g., 220, 230 and 250 of FIG. 3.)

In at least some example embodiments consistent with the example method 400, the process for selecting routes is a BGP decision process. (See, e.g., 214 of FIG. 3.)

In at least some example embodiments consistent with the example method 400, the first storage system includes both (1) a first data structure for storing the incoming routing information and (2) a second data structure for storing the received copy of the state information. For example, the Adj-RIBS-In 312 and Adj-RIBS-Out 318 may be stored in separate data structures. Alternatively, the first storage system may include a single data structure for storing both the incoming routing information and the received copy of the state information.

§ 4.4 Example Apparatus

Figure 5:
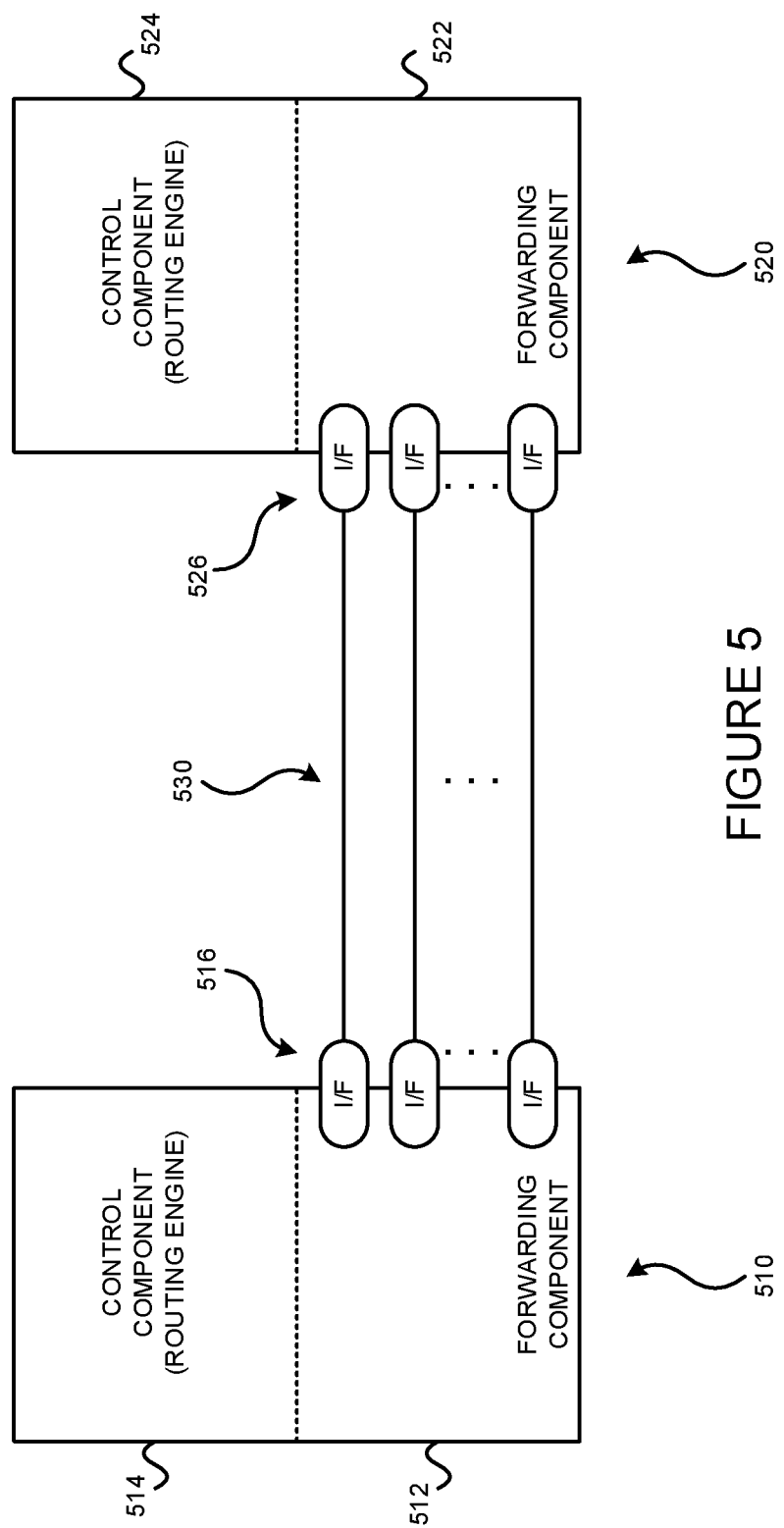
FIG. 5 illustrates an example environment including two systems coupled via communications links.

FIG. 5 illustrates two data forwarding systems 510 and 520 coupled via communications links 530. The links may be physical links or "wireless" links. The data forwarding systems 510,520 may be routers for example. If the data forwarding systems 510,520 are example routers, each may include a control component (e.g., a routing engine) 514,524 and a forwarding component 512,522. Each data forwarding system 510,520 includes one or more interfaces 516,526 that terminate one or more communications links 530.

As just discussed above, and referring to FIG. 6, some example routers 600 include a control component (e.g., routing engine) 610 and a packet forwarding component (e.g., a packet forwarding engine) 690.

The control component 610 may include an operating system (OS) kernel 620, routing protocol process(es) 630, label-based forwarding protocol process(es) 640, interface process(es) 650, user interface (e.g., command line interface) process(es) 660, and chassis process(es) 670, and may store routing table(s) 639, label forwarding information 645, and forwarding (e.g., route-based and/or label-based) table(s) 680. As shown, the routing protocol process(es) 630 may support routing protocols such as the routing information protocol ("RIP") 631, the intermediate system-to-intermediate system protocol ("IS-IS") 632, the open shortest path first protocol ("OSPF") 633, the enhanced interior gateway routing protocol ("EIGRP") 634 and the boarder gateway protocol ("BGP") 635, and the label-based forwarding protocol process(es) 640 may support protocols such as BGP 635, the label distribution protocol ("LDP")

636 and the resource reservation protocol ("RSVP") 637. One or more components (not shown) may permit a user 665 to interact with the user interface process(es) 660. Similarly, one or more components (not shown) may permit an outside device to interact with one or more of the router protocol process(es) 630, the label-based forwarding protocol process(es) 640, the interface process(es) 650, and the chassis process(es) 670, via SNMP 685, and such processes may send information to an outside device via SNMP 685.

The packet forwarding component 690 may include a microkernel 692, interface process(es) 693, distributed ASICs 694, chassis process(es) 695 and forwarding (e.g., route-based and/or label-based) table(s) 696.

Figure 6:
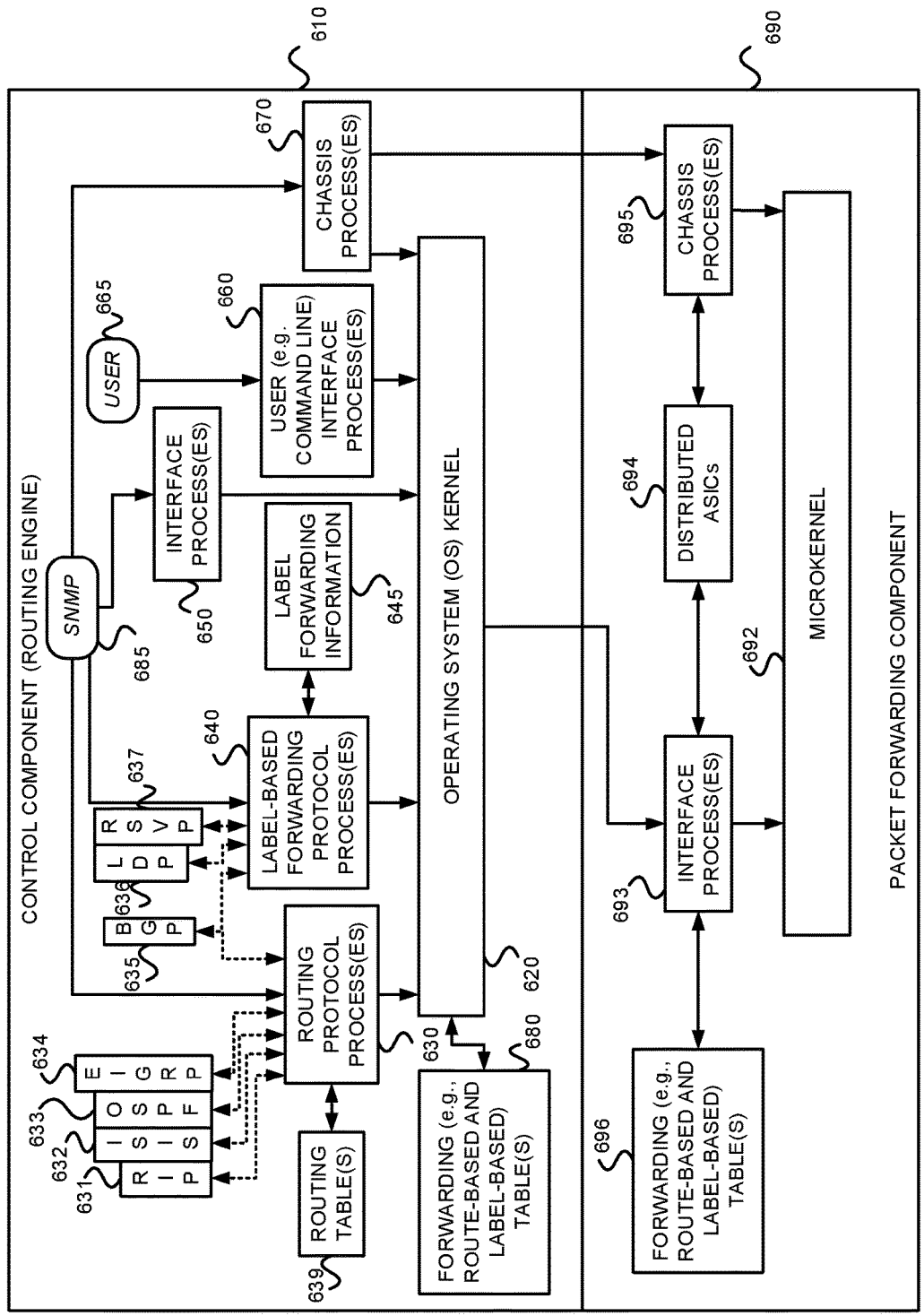
FIG. 6 is a block diagram of an example router on which the present invention may be implemented.

In the example router 600 of FIG. 6, the control component 610 handles tasks such as performing routing protocols, performing label-based forwarding protocols, control packet processing, etc., which frees the packet forwarding component 690 to forward received packets quickly. That is, received control packets (e.g., routing protocol packets and/or label-based forwarding protocol packets) are not fully processed on the packet forwarding component 690 itself, but are passed to the control component 610, thereby reducing the amount of work that the packet forwarding component 690 has to do and freeing it to process packets to be forwarded efficiently. Thus, the control component 610 is primarily responsible for running routing protocols and/or label-based forwarding protocols, maintaining the routing tables and/or label forwarding information, sending forwarding table updates to the packet forwarding component 690, and performing system management. The example control component 610 may handle routing protocol packets, provide a management interface, provide configuration management, perform accounting, and provide alarms. The processes 630, 640, 650, 660 and 670 may be modular, and may interact with the OS kernel 620. That is, nearly all of the processes communicate directly with the OS kernel 620. Using modular software that cleanly separates processes from each other isolates problems of a given process so that such problems do not impact other processes that may be running. Additionally, using modular software facilitates easier scaling.

Still referring to FIG. 6, the example OS kernel 620 may incorporate an application programming interface ("API") system for external program calls and scripting capabilities. The control component 610 may be based on an Intel PCI platform running the OS from flash memory, with an alternate copy stored on the router's hard disk. The OS kernel 620 is layered on the Intel PCI platform and establishes communication between the Intel PCI platform and processes of the control component 610. The OS kernel 620 also ensures that the forwarding tables 696 in use by the packet forwarding component 690 are in sync with those 680 in the control component 610. Thus, in addition to providing the underlying infrastructure to control component 610 software processes, the OS kernel 620 also provides a link between the control component 610 and the packet forwarding component 690.

Referring to the routing protocol process(es) 630 of FIG. 6, this process(es) 630 provides routing and routing control functions within the platform. In this example, the RIP 631, ISIS 632, OSPF 633 and EIGRP 634 (and BGP 635) protocols are provided. Naturally, other routing protocols may be provided in addition, or alternatively. Similarly, the label-based forwarding protocol process(es) 640 provides label forwarding and label control functions. In this example, the LDP 636 and RSVP 637 (and BGP 635) protocols are provided. Naturally, other label-based forwarding protocols (e.g., MPLS) may be provided in addition, or alternatively. In the example router 600, the routing table(s) 639 is produced by the routing protocol process(es) 630, while the label forwarding information 645 is produced by the label-based forwarding protocol process(es) 640.

Still referring to FIG. 6, the interface process(es) 650 performs configuration of the physical interfaces (Recall, e.g., 516 and 526 of FIG. 5.) and encapsulation.

The example control component 610 may provide several ways to manage the router. For example, it 610 may provide a user interface process(es) 660 which allows a system operator 665 to interact with the system through configuration, modifications, and monitoring. The SNMP 685 allows SNMP-capable systems to communicate with the router platform. This also allows the platform to provide necessary SNMP information to external agents. For example, the SNMP 685 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 610, thereby avoiding slowing traffic forwarding by the packet forwarding component 690.

Although not shown, the example router 600 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provides interaction with a command line interface ("CLI") 660 via a console port, an auxiliary port, and/or a management Ethernet port The packet forwarding component 690 is responsible for properly outputting received packets as quickly as possible. If there is no entry in the forwarding table for a given destination or a given label and the packet forwarding component 690 cannot perform forwarding by itself, it 690 may send the packets bound for that unknown destination off to the control component 610 for processing. The example packet forwarding component 690 is designed to perform Layer 2 and Layer 3 switching, route lookups, and rapid packet forwarding.

As shown in FIG. 6, the example packet forwarding component 690 has an embedded microkernel 692, interface process(es) 693, distributed ASICs 694, and chassis process(es) 695, and stores a forwarding (e.g., route-based and/or label-based) table(s) 696. The microkernel 692 interacts with the interface process(es) 693 and the chassis process(es) 695 to monitor and control these functions. The interface process(es) 692 has direct communication with the OS kernel 620 of the control component 610. This communication includes forwarding exception packets and control packets to the control component 610, receiving packets to be forwarded, receiving forwarding table updates, providing information about the health of the packet forwarding component 690 to the control component 610, and permitting configuration of the interfaces from the user interface (e.g., CLI) process(es) 660 of the control component 610. The stored forwarding table(s) 696 is static until a new one is received from the control component 610. The interface process(es) 693 uses the forwarding table(s) 696 to look up next-hop information. The interface process(es) 693 also has direct communication with the distributed ASICs 694.

Finally, the chassis process(es) 695 may communicate directly with the microkernel 692 and with the distributed ASICs 694.

In the example router 600, the example method 200 or 300 consistent with the present invention may be implemented in the BGP protocol 635.

Figure 7:
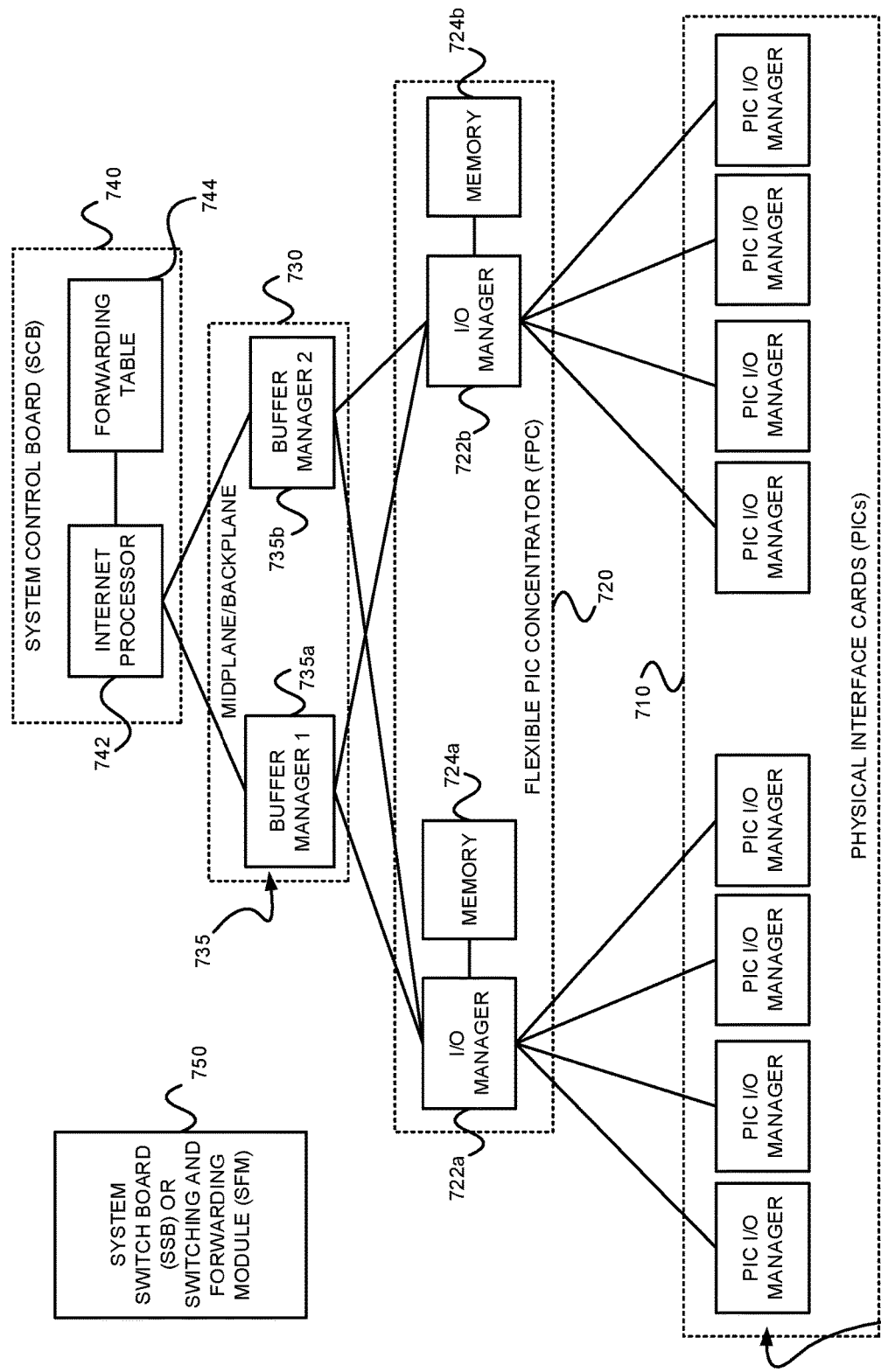
FIG. 7 is a block diagram of example distributed application specific integrated circuits ("ASICs") that may be provided in the example router of FIG. 6.

Referring back to distributed ASICs 694 of FIG. 6, FIG. 7 is an example of how the ASICS may be distributed in the packet forwarding component 690 to divide the responsibility of packet forwarding. As shown in FIG. 7, the ASICs of the packet forwarding component 690 may be distributed on physical interface cards ("PICs") 710, flexible PIC concentrators ("FPCs") 720, a midplane or backplane 730, and a system control board(s) 740 (for switching and/or forwarding). Switching fabric is also shown as a system switch board ("SSB"), or a switching and forwarding module ("SFM") 750. Each of the PICs 710 includes one or more PIC I/O managers 715. Each of the FPCs 720 includes one or more I/O managers 722, each with an associated memory 724. The midplane/backplane 730 includes buffer managers 735*a*, 735*b*. Finally, the system control board 740 includes an internet processor 742 and an instance of the forwarding table 744 (Recall, e.g., 696 of FIG. 6).

Still referring to FIG. 7, the PICs 710 contain the interface ports. Each PIC 710 may be plugged into an FPC 720. Each individual PIC 710 may contain an ASIC that handles media-specific functions, such as framing or encapsulation. Some example PICs 710 provide SDH/SONET, ATM, Gigabit Ethernet, Fast Ethernet, and/or DS3/E3 interface ports.

An FPC 720 can contain from one or more PICs 710, and may carry the signals from the PICs 710 to the midplane/backplane 730 as shown in FIG. 7.

The midplane/backplane 730 holds the line cards. The line cards may connect into the midplane/backplane 730 when inserted into the example router's chassis from the front. The control component (e.g., routing engine) 610 may plug into the rear of the midplane/backplane 730 from the rear of the chassis. The midplane/backplane 730 may carry electrical (or optical) signals and power to each line card and to the control component 610.

The system control board 740 may perform forwarding lookup. It 740 may also communicate errors to the routing engine. Further, it 740 may also monitor the condition of the router based on information it receives from sensors. If an abnormal condition is detected, the system control board 740 may immediately notify the control component 610.

Referring to FIGS. 7, 8A and 8B, in some exemplary routers, each of the PICs 710,610' contains at least one I/O manager ASIC 715 responsible for media-specific tasks, such as encapsulation. The packets pass through these I/O ASICs on their way into and out of the router. The I/O manager ASIC 715 on the PIC 710,610' is responsible for managing the connection to the I/O manager ASIC 722 on the FPC 720,620', managing link-layer framing and creating the bit stream, performing cyclical redundancy checks (CRCs), and detecting link-layer errors and generating alarms, when appropriate. The FPC 720 includes another I/O manager ASIC 722. This ASIC 722 takes the packets from the PICs 710 and breaks them into (e.g., 74-byte) memory blocks. This FPC I/O manager ASIC 722 sends the blocks to a first distributed buffer manager (DBM) 735*a*', decoding encapsulation and protocol-specific information, counting packets and bytes for each logical circuit, verifying packet integrity, and applying class of service (CoS) rules to packets. At this point, the packet is first written to memory. More specifically, the example DBM ASIC 735*a*' manages and writes packets to the shared memory 724 across all FPCs 720. In parallel, the first DBM ASIC 735*a*' also extracts information on the destination of the packet and passes this forwarding-related information to the Internet processor 742/642'. The Internet processor 742/642' performs the route lookup using the forwarding table 744 and sends the information over to a second DBM ASIC 735*b*'. The Internet processor ASIC 742/642' also collects exception packets (i.e., those without a forwarding table entry) and sends them to the control component 610. The second DBM ASIC 735*b*' then takes this information and the 74-byte blocks and forwards them to the I/O manager ASIC 722 of the egress FPC 720/620' (or multiple egress FPCs, in the case of multicast) for reassembly. (Thus, the DBM ASICs 735*a*' and 735*b*' are responsible for managing the packet memory 724 distributed across all FPCs 720/620', extracting forwarding-related information from packets, and instructing the FPC where to forward packets.)

The I/O manager ASIC 722 on the egress FPC 720/620' may perform some value-added services. In addition to incrementing time to live ("TTL") values and re-encapsulating the packet for handling by the PIC 710, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 722 on the egress FPC 720/620' may be responsible for receiving the blocks from the second DBM ASIC 735*b*', incrementing TTL values, queuing a pointer to the packet, if necessary, before applying CoS rules, re-encapsulating the blocks, and sending the encapsulated packets to the PIC I/O manager ASIC 715.

Figure 9:
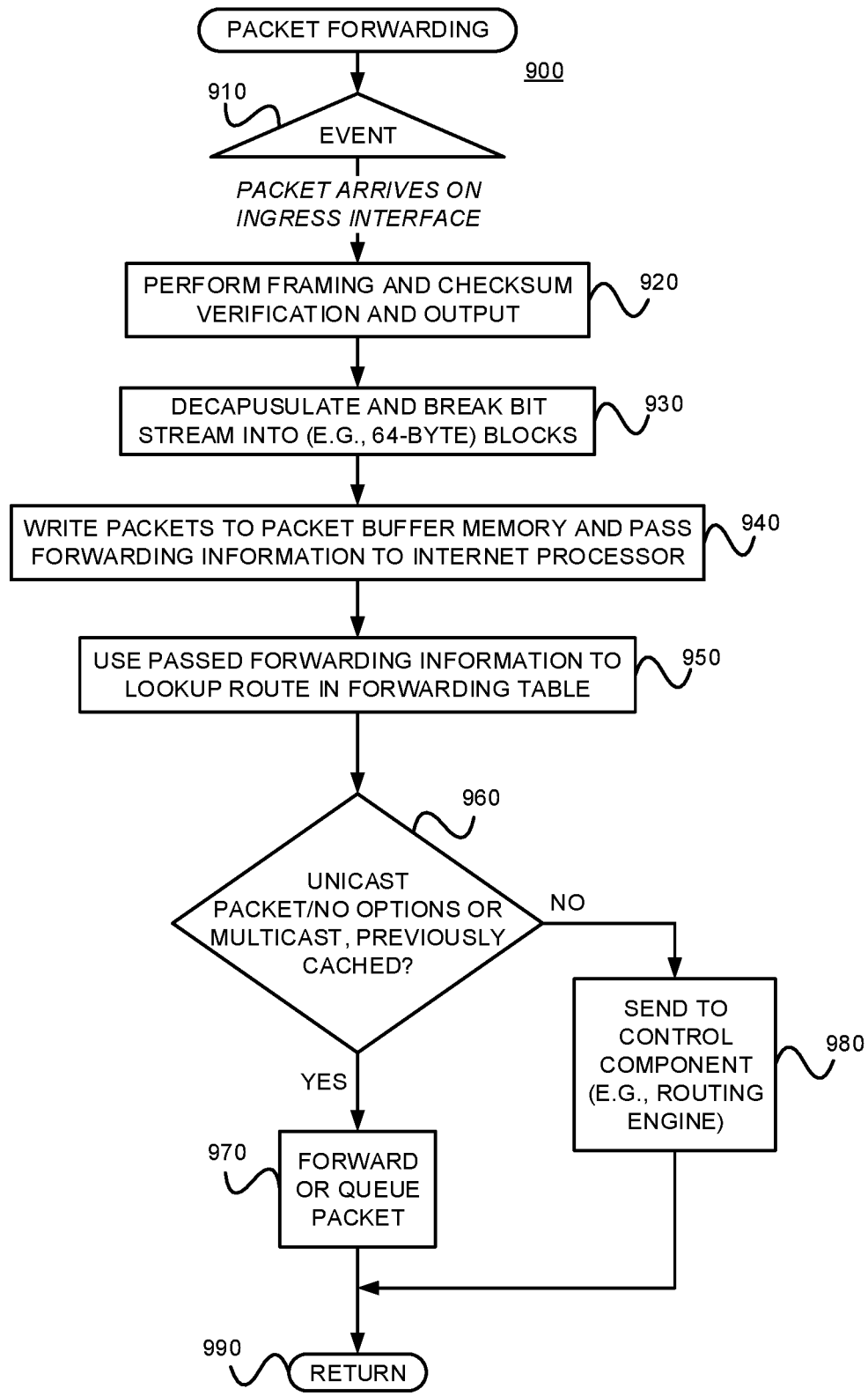
FIG. 9 is a flow diagram of an example packet forwarding method that may be implemented on any of the example routers of FIGS. 6 and 7.

FIG. 9 is a flow diagram of an example method 900 for providing packet forwarding in the example router. The main acts of the method 900 are triggered when a packet is received on an ingress (incoming) port or interface. (Event 910) The types of checksum and frame checks that are required by the type of medium it serves are performed and the packet is output, as a serial bit stream. (Block 920) The packet is then decapsulated and parsed into (e.g., 64-byte) blocks. (Block 930) The packets are written to buffer memory and the forwarding information is passed on the Internet processor. (Block 940) The passed forwarding information is then used to lookup a route in the forwarding table. (Block 950) Note that the forwarding table can typically handle unicast packets that do not have options (e.g., accounting) set, and multicast packets for which it already has a cached entry. Thus, if it is determined that these conditions are met (YES branch of Decision 960), the packet forwarding component finds the next hop and egress interface, and the packet is forwarded (or queued for forwarding) to the next hop via the egress interface (Block 970) before the method 900 is left (Node 990) Otherwise, if these conditions are not met (NO branch of Decision 960), the forwarding information is sent to the control component 610 for advanced forwarding resolution (Block 980) before the method 900 is left (Node 990).

Referring back to block 970, the packet may be queued. Actually, as stated earlier with reference to FIG. 7, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 722 may send a request for the packet to the second DBM ASIC 735*b*. The DBM ASIC 735 reads the blocks from shared memory and sends them to the I/O manager ASIC 722 on the FPC 720, which then serializes the bits and sends them to the media-specific ASIC of the egress interface. The I/O manager ASIC 715 on the egress PIC 710 may apply the physical-layer framing, perform the CRC, and send the bit stream out over the link.

Referring back to block 980 of FIG. 9, as well as FIG. 7, regarding the transfer of control and exception packets, the system control board 740 handles nearly all exception packets. For example, the system control board 740 may pass exception packets to the control component 610.

Although example embodiments consistent with the present invention may be implemented on the example routers of FIG. 5 or 6, embodiments consistent with the present invention may be implemented on communications network nodes (e.g., routers, switches, etc.) having different architectures. More generally, embodiments consistent with the present invention may be implemented on an example system 1000 as illustrated on FIG. 10.

Figure 10:
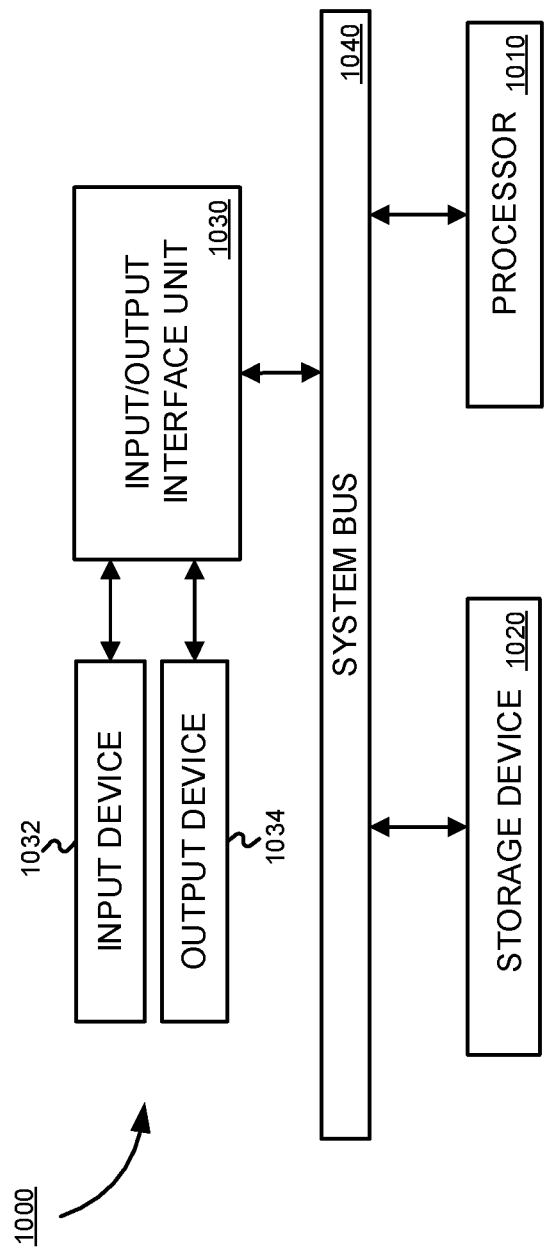
FIG. 10 is a block diagram of an example processor-based system that may be used to execute the example methods for providing a data store of incoming routing information and state information, decoupled from a route selection process, and/or to store information used and/or generated by such example methods.

FIG. 10 is a block diagram of an exemplary machine 1000 that may perform one or more of the processes described, and/or store information used and/or generated by such processes. The exemplary machine 1000 includes one or more processors 1010, one or more input/output interface units 1030, one or more storage devices 1020, and one or more system buses and/or networks 1040 for facilitating the communication of information among the coupled elements. One or more input devices 1032 and one or more output devices 1034 may be coupled with the one or more input/output interfaces 1030. The one or more processors 1010 may execute machine-executable instructions (e.g., C or C++ running on the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1020 and/or may be received from an external source via one or more input interface units 1030. The machine executable instructions may be stored as various software modules, each module performing one or more operations. Functional software modules are examples of components of the invention.

In some embodiments consistent with the present invention, the processors 1010 may be one or more microprocessors and/or ASICs. The bus 1040 may include a system bus. The storage devices 1020 may include system memory, such as read only memory (ROM) and/or random access memory (RAM). The storage devices 1020 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present invention (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present invention (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.5 Refinements, Alternative and Extensions

Although some example embodiments consistent with the present invention were described in the context of the version of BGP described in RFC 4271, other example embodiments consistent with the present invention can be used with other protocols and other versions of BGP. For example, other BGP NLRI are exchanged using multi-protocol BGP extensions. (See, e.g., RFC 4760 and update and extension RFCs to RFC 4271 and RFC4760, incorporated herein by reference.) That is, use of the present invention is not limited to the version of BGP described in RFC 4271.

Although Junos non-stop routing ("NSR") from Juniper Networks of Sunnyvale, Calif. partially addresses the problem addressed by the example embodiments and methods, NSR also uses active protocol sniffing to construct the observed Adj-Ribs-Out state. Unfortunately, this aspect of NSR negatively impacts the performance of the NSR backup device due to the increased scale. It is possible, however, to apply example apparatus and methods consistent with the present invention to the existing NSR architecture with appropriate redesign of the underlying BGP packet generation and replication subsystems.

§ 4.6 Conclusions

As should be appreciated from the foregoing, example embodiments and methods consistent with the present invention protect the network from internal churn, whether from a crash, a bug or an upgrade, from the rest of the BGP routing system, and do so without using a full BGP implementation running on a redundant system.

Unlike NSR, example embodiments consistent with the present invention may place a new process in the workflow path that does the work of distributing the (e.g., M) updates. However, the messaging between the BGP process and the outward facing proxy can be more optimal (e.g. a message saying "this update, replicate to this peer-set").

What is claimed is:

1. A computer-implemented method for providing a data store of incoming routing information and state information to be distributed, the computer-implemented method comprising:
   a) receiving, from at least one outside peer device, the incoming routing information;
   b) storing the incoming routing information received in a first storage system;
   c) providing a copy of at least some of the stored incoming routing information received to a second storage system used by a process for selecting routes using the routing information, the process generating the state information to be distributed and storing the state information in the second storage system;

d) receiving a copy of the state information generated and stored by the process;

e) storing the received copy of the state information in the first storage system; and f) providing at least some information from the copy of the state information to at least one outside peer device in accordance with a route advertisement process, regardless of a state or status of the process for selecting routes.

2. The computer-implemented method of claim 1 wherein each of the at least one outside peer device is a BGP peer device, wherein the routing information is received from a BGP peer device via a BGP UPDATE message, and wherein at least some information from the copy of the state information is provided to a BGP peer device via another BGP UPDATE message.

3. The computer-implemented method of claim 1 wherein the process for selecting routes is a BGP decision process and wherein the state information includes at least one of the selected routes.

4. The computer-implemented method of claim 1 wherein the first storage system includes (1) a first data structure for storing the incoming routing information and (2) a second data structure for storing the received copy of the state information.

5. The computer-implemented method of claim 1 wherein the first storage system includes a data structure for storing both the incoming routing information and the received copy of the state information.

6. Apparatus comprising:

a) an input for receiving, from at least one outside peer device, incoming routing information;

b) a first storage system storing the incoming routing information received;

c) communications interface for
  (1) providing a copy of at least some of the stored incoming routing information received to a second storage system used by a process for selecting routes using the routing information, the process generating state information to be distributed and storing the state information in the second storage system, and
  (2) receiving a copy of the state information generated and stored by the process, wherein the received copy the state information is stored in the first storage system; and d) an output for providing at least some information from the copy of state information stored in the first storage system to at least one outside peer device in accordance with a route advertisement process, regardless of a state or status of the process for selecting routes.

7. The apparatus of claim 6 wherein each of the at least one outside peer device is a BGP peer device, wherein the routing information is received from a BGP peer device via a BGP UPDATE message, and wherein at least some information from the copy of the state information is provided to a BGP peer device via another BGP UPDATE message.

8. The apparatus of claim 6 wherein the process for selecting routes is a BGP decision process and wherein the state information includes at least one of the selected routes.

9. The apparatus of claim 6 wherein the first storage system includes (1) a first data structure for storing the incoming routing information and (2) a second data structure for storing the received copy of the state information.

10. The apparatus of claim 6 wherein the first storage system includes a data structure for storing both the incoming routing information and the received copy of the state information.

11. A non-transitory computer-readable medium storing processor-executable instructions which, when executed by at least one processor, cause at least one processor to perform a method for providing a data store of incoming routing information and state information to be distributed, comprising:

a) receiving, from at least one outside peer device, the incoming routing information;

b) storing the incoming routing information received in a first storage system;

c) providing a copy of at least some of the stored incoming routing information received to a second storage system used by a process for selecting routes using the routing information, the process generating the state information to be distributed and storing the state information in the second storage system;

d) receiving a copy of the state information generated and stored by the process;

e) storing the received copy of the state information in the first storage system; and f) providing at least some information from the copy of state information to at least one outside peer device in accordance with a route advertisement process, regardless of a state or status of the process for selecting routes.

12. The non-transitory computer-readable medium of claim 11 wherein each of the at least one outside peer device is a BGP peer device, wherein the routing information is received from a BGP peer device via a BGP UPDATE message, and wherein at least some information from the copy of the state information is provided to a BGP peer device via another BGP UPDATE message.

13. The non-transitory computer-readable medium of claim 11 wherein the process for selecting routes is a BGP decision process and wherein the state information includes at least one selected route.

14. The non-transitory computer-readable medium of claim 11 wherein the first storage system includes (1) a first data structure for storing the incoming routing information and (2) a second data structure for storing the received copy of the state information.

15. The non-transitory computer-readable medium of claim 11 wherein the first storage system includes a data structure for storing both the incoming routing information and the received copy of the state information.

* * * * *